United States Patent
Wang et al.

(10) Patent No.: US 10,328,681 B2
(45) Date of Patent: Jun. 25, 2019

(54) VACUUM LAMINATING DEVICE

(71) Applicants: BOE TECHNOLOGY GROUP CO., LTD., Beijing (CN); BOE (Hebei) Mobile Display Technology Co., Ltd., Gu'An, Hebei (CN)

(72) Inventors: Dapeng Wang, Beijing (CN); Hongwei Cui, Beijing (CN)

(73) Assignees: BOE TECHNOLOGY GROUP CO., LTD., Beijing (CN); BOE (HEBEI) MOBILE DISPLAY TECHNOLOGY CO., LTD., Gu An (CN)

( * ) Notice: Subject to any disclaimer, the term of this patent is extended or adjusted under 35 U.S.C. 154(b) by 520 days.

(21) Appl. No.: 14/743,220

(22) Filed: Jun. 18, 2015

(65) Prior Publication Data
US 2016/0279917 A1  Sep. 29, 2016

(30) Foreign Application Priority Data
Mar. 24, 2015  (CN) .......................... 2015 1 0131564

(51) Int. Cl.
 *B32B 37/10* (2006.01)
(52) U.S. Cl.
 CPC ...... *B32B 37/1018* (2013.01); *B32B 2309/12* (2013.01); *B32B 2457/202* (2013.01)
(58) Field of Classification Search
 CPC .......................... B32B 37/10; B32B 37/1018
 (Continued)

(56) References Cited

U.S. PATENT DOCUMENTS

| 5,671,910 A | * | 9/1997 | Davies | .................. B25B 11/005 269/21 |
| 2003/0168176 A1 | * | 9/2003 | Byun | ...................... B32B 37/10 156/382 |

(Continued)

FOREIGN PATENT DOCUMENTS

| CN | 202421676 U | 9/2012 |
| CN | 103223760 A | 7/2013 |
| JP | 2001341147 A | 12/2001 |

OTHER PUBLICATIONS

Machine Translation of CN 103223760.*
(Continued)

*Primary Examiner* — Christopher T Schatz
(74) *Attorney, Agent, or Firm* — Kinney & Lange, P.A.

(57) ABSTRACT

Disclosed is a vacuum laminating device and a method of using such a vacuum laminating device to laminate a first object and a second object together. The vacuum laminating device comprises a first platform, a second platform, and a lifting pushrod that are receivable in a vacuum chamber; a bottom surface of the first platform is provided with a first adsorbing surface suitable for adsorbing the first object; the second platform is disposed below the first platform and configured to be movable up and down below the first platform so as to make a laminating contact with the first platform, and an upper surface of the second platform is provided with a second adsorbing surface facing the first adsorbing surface and being suitable for adsorbing the second object; and the lifting pushrod is disposed within a region where a central region of the second adsorbing surface is located, configured to be movable up and down independently below the first platform so as to push up a central portion of the second object so that the central portion make a laminating contact with the first object firstly. With the vacuum laminating device, air bubbles are expelled (Continued)

out from center to both sides of the laminated object, so that air bubbles are efficiently expelled out during a vacuum laminating process, and thereby de-bubbling processes are omitted and a laminating yield rate is significantly improved.

14 Claims, 1 Drawing Sheet

(58) Field of Classification Search
USPC .......................................... 156/285, 286, 381
See application file for complete search history.

(56) References Cited

U.S. PATENT DOCUMENTS

| | | | | |
|---|---|---|---|---|
| 2004/0239121 | A1* | 12/2004 | Morris | E05B 13/004 |
| | | | | 292/39 |
| 2005/0167036 | A1* | 8/2005 | Yokoyama | B65G 49/061 |
| | | | | 156/230 |
| 2008/0135127 | A1* | 6/2008 | Hwang | G02F 1/1303 |
| | | | | 141/65 |

OTHER PUBLICATIONS

First Chinese Office Action for Chinese Patent Application No. 201510131564.3, dated Apr. 19, 2016.
Second Chinese Office Action, for Chinese Patent Application No. 201510131564.3, dated Sep. 1, 2016, 18 pages.

* cited by examiner

VACUUM LAMINATING DEVICE

CROSS-REFERENCE TO RELATED APPLICATION

This application claims the benefits of Chinese Patent Application No. 201510131564.3 filed on Mar. 24, 2015 in the State Intellectual Property Office of China, whole disclosure of which is incorporated herein by reference.

BACKGROUND OF THE INVENTION

Field of the Invention

Embodiments of the present invention generally relate to the technical field of display technology, and specifically, relate to a vacuum laminating device.

Description of the Related Art

A full laminating process has been widely used in touch screen industry, and during the development of the full laminating process, defects such as bubbles may be easily generated, no matter the process relates to Optically Clear Adhesive (OCA) or to Liquid Optically Clear Adhesive (LOCA). Expelling out the bubbles is a technical difficulty of the full laminating process, and a de-bubbling device should be added to many production lines.

Existing vacuum laminating devices need to perform the laminating operation in a vacuum chamber. Although within a vacuum environment, the bubbles cannot be completely expelled out when performing a full surface face-to-face laminating operation, no matter an OCA or LOCA process is used, and a probability of presence of bubbles in the VE region of the laminated product is 100%. That is to say, bubbles are present in the products more or less. As a result, a de-bubbling process should be added to the production line, and after a first, a second, and a third de-bubbling operations, the defect rate caused by bubbles can be reduced to 3%, which significantly affects the yield rate of the products. Moreover, the added de-bubbling process not only need additional steps for the laminating process, but also adds difficulties to the whole process; at the same time, one de-bubbling operation cannot completely expel out the bubbles, and more de-bubbling operations or steps are needed, thereby the yield rate is adversely affected and a control of the process is very difficult.

SUMMARY OF THE INVENTION

The present invention has been made to overcome or alleviate at least one aspect of the above mentioned disadvantages. One technical problem to be solved by the present invention is in that yield rate of existing laminating processes is low, and de-bubbling processes are needed, which badly affects the yield rate and results in difficult in controlling the process.

According to an aspect of the present invention, there is provided a vacuum laminating device for laminating a first object and a second object together, comprising a first platform, a second platform, and a lifting pushrod that are receivable in a vacuum chamber, wherein a bottom surface of the first platform is provided with a first adsorbing surface suitable for adsorbing the first object;

the second platform is disposed below the first platform and configured to be movable up and down below the first platform so as to make a laminating contact with the first platform, and an upper surface of the second platform is provided with a second adsorbing surface facing the first adsorbing surface and being suitable for adsorbing the second object; and the lifting pushrod is disposed within a region where a central region of the second adsorbing surface is located, configured to be movable up and down independently below the first platform so as to push up a central portion of the second object so that the central portion make a laminating contact with the first object firstly.

According to another aspect of the present invention, there is provided a method of using the above vacuum laminating device to laminate a first object and a second object together in a vacuum environment, comprising steps of:

S1: adsorbing the first object onto the first adsorbing surface by the first platform, adsorbing the second object onto the second adsorbing surface by the second platform, and locating the lifting pushrod under the second object;

S2: arranging the vacuum laminating device in the vacuum chamber and vacuumizing the vacuum chamber, then raising the second platform to a pre-laminating position where the second object and the first object are close to but do not contact with each other;

S3: driving the lifting pushrod to move upward so as to push up the central portion of the second object so that the central portion contacts the first object firstly; and S4: driving the second platform to move upward so that the first object and the second object are completely laminated with each other.

The technical solutions of the present invention provide the following advantage technical effect: with the vacuum laminating device provided according to present invention, a liquid crystal screen is adsorbed onto a first platform, and a glass plate is adsorbed onto a second platform, and a lifting pushrod is used to expel out air bubbles from centre to both sides when a vacuum laminating operation is performed, such that the bubbles are reduced and a de-bubbling process is not needed, thereby a yield rate if the laminating process is significantly improved.

EXPLANATION OF REFERENCE NUMBERS

Figure 1:
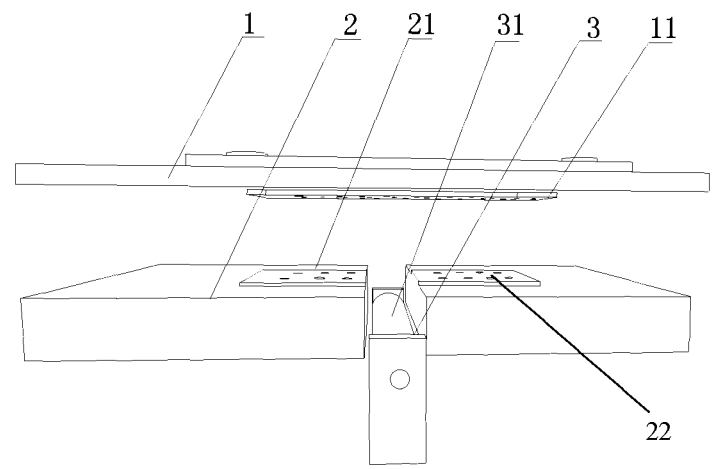
FIG. 1 is a schematic structural drawing of a vacuum laminating device according to one exemplary embodiment of the present invention.

1: first platform;
2: second platform;
3: lifting pushrod;
11: first adsorbing surface;
21: second adsorbing surface;
22: adsorbing opening;
23: half-platform structure;
31: arc surface.

DETAILED DESCRIPTION OF PREFERRED EMBODIMENTS OF THE INVENTION

Exemplary embodiments of the present disclosure will be described hereinafter in detail with reference to the attached drawings, wherein the like reference numerals refer to the like elements. The present disclosure may, however, be embodied in many different forms and should not be construed as being limited to the embodiment set forth herein; rather, these embodiments are provided so that the present disclosure will be thorough and complete, and will fully convey the concept of the disclosure to those skilled in the art.

It is to be noted that, throughout the specification, unless otherwise defined, the term "a plurality of" means two or more; orientations or positional relationships indicted by terms "up", "down", "left", "right", "inside", "outside", "front end", "rear end", "head", "tail" and the like are those shown in the drawings, and these terms are only intended to describe the disclosure and simplify the description, and not to indicate or imply that a certain device or unit should have a specific orientation, or should be configured or operated in a specific orientation. Moreover, terms "first", "second", "third" and the like are only used for purpose of description, and cannot be interpreted as indicating or implying their relative importance.

Further to be noted, in the description of the disclosure, unless otherwise defined or limited, terms "mount", "connect", "connect with" and the like should be interpreted broadly. For example, it may be a permanent connection, or a detachable connection, or an integrated connection; it may be a mechanical connection, or an electrical connection; it may be a direct connection, or an indirect connection via a medium. For those skilled in the art, specific meanings of these terms in this specification could be determined according to practical situations.

Figure 2:
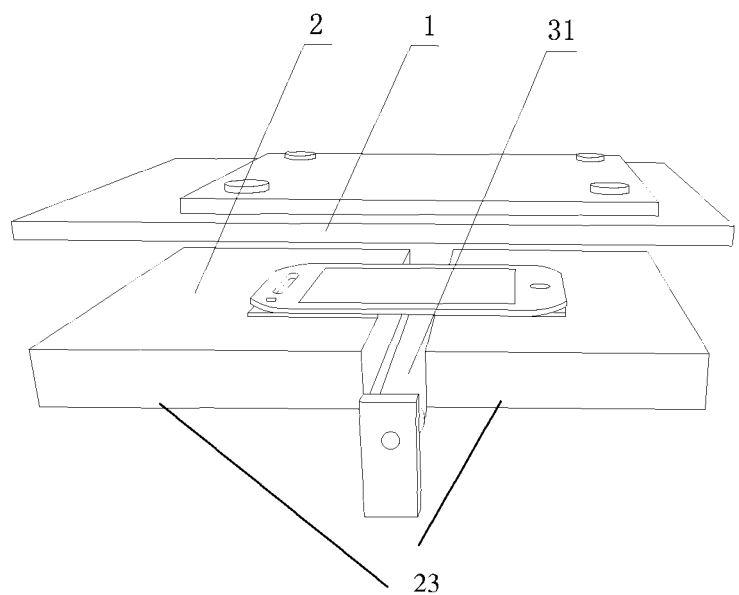
FIG. 2 is a schematic drawing showing an operating state of the vacuum laminating device according to the exemplary embodiment of the present invention.

A vacuum laminating device is provided according to one exemplary embodiment of the present invention. As shown in FIGS. 1-2, the vacuum laminating device is disposed in a vacuum chamber (not shown), so as to ensure a full laminating process is performed in a vacuum environment. Specifically, the vacuum laminating device comprises a first platform 1, a second platform 2 and a lifting pushrod 3 which are receivable in the vacuum chamber; the first platform 1 is secured in position at an upper portion of the vacuum chamber, and a bottom surface of the first platform 1 is provided with a first adsorbing surface 11 suitable for adsorbing a liquid crystal screen to be laminated, wherein the liquid crystal screen to be laminated comprise a liquid crystal display (LCD) screen, a liquid crystal module (LCM) screen, an organic light emitting diode (OLED) screen, or the like; moreover, the second platform 2 is disposed below the first platform 1, and an upper surface of the second platform 2 is provided with a second adsorbing surface 21 facing the first adsorbing surface 11 and being suitable for adsorbing a glass plate; at the same time, the lifting pushrod 3 is disposed within a region where a central portion of the second adsorbing surface 21 is located, and the second platform 2 and the lifting pushrod 3 are configured move independently below the first platform 1. The second platform 2 is configured to make a laminating contact with the first platform 1, and the lifting pushrod is configured to jack up a central portion of the glass plate. When a vacuum laminating process in performed, gas bubbles are expelled out from the central portion to both sides of the glass plate by using the lifting pushrod 3, so that the generation of gas bubbles is reduced, and a de-bubbling process can be omitted, and yield rate of the laminating process is thereby increased.

The vacuum laminating device according to the embodiment of the present invention further comprises a driving unit (s) (not shown) connected respectively to the second platform 2 and the lifting pushrod 3, and the second platform 2 and the lifting pushrod 3 are moved up and down by the driving unit (s), respectively; wherein, the driving unit may be a motor, a cylinder or other power equipment, which is easy to be got and has a high degree of automation.

The lifting pushrod 3 is disposed vertically within a region where the central portion of the second adsorbing surface 21 is located. In one example, the top of the lifting pushrod is provided with an arc surface, which can be extended upward beyond an upper side of the second platform to contact the central portion of the glass plate firstly. The arc surface may be formed by a cylinder, so as to facilitate a laminating contact with the glass plate and avoid a mechanical damage efficiently.

In one example, as shown in FIGS. 1 and 2, the second platform 2 is divided into two half-platform structures 23 (a left platform and a right platform) spaced apart from each other, and a corresponding half of the adsorbing surface 23 is provided on top of each half-platform structure; the lifting pushrod 3 is partially disposed between the two half-platform structures and moves up and down, thereby the central portion of the glass plate can be jacked up to contact the liquid crystal screen firstly.

To be noted, the second platform 2 may be divided into two separated half-platform structures, or a space for receiving the lifting pushrod 3 may be provided in the central portion of the second platform 2, that is to say, the lifting pushrod 3 may be disposed inside the receiving space and may extend outward from the receiving space when moving upward. Moreover, the lifting pushrod 3 may be driven by a driving unit, or the lifting pushrod may have a telescopic rod structure.

In one example, materials of the first platform 1 and the second platform 2 may be different from each other, the first platform 1 is made of a metal material having a electrostatic protection property, and positioning fixtures (not shown) are provided at the periphery of the first platform; the second platform 2 is made of a rubber material having a electrostatic protection property, and the rubber material can provide a buffering function during the laminating process so as to prevent a product from receiving an excess force. Moreover, the lifting pushrod 3 may also be made of a rubber material having a electrostatic protection property, and preferably, of a soft rubber having a hardness of 45 degrees.

In one example, as shown in FIG. 1, the second adsorbing surface 21 of the second platform 2 is provided with a plurality of adsorbing openings 22 therein, and each of the adsorbing openings 22 is connected to a vacuum pipeline. Of course, the vacuum pipeline is connected to a suction device (e.g., a vacuum pump) for providing suction force on the second adsorbing surface 21.

An adsorbing sheet may be fixed on the first adsorbing surface 11 of the first platform 1, is provided with a plurality of adsorbing holes in the surface thereof. A material of the adsorbing sheet may be, for example, Teflon, and edges of the adsorbing sheet are secured on the first adsorbing surface 11 by the fixtures, thereby positioning and securing the adsorbing sheet of and meeting the requirement for stability.

Exemplarily, the surface of the adsorbing sheet is polished, and the plurality of adsorbing holes are machined in the adsorbing sheet and occupy an area which is about 30% of a total area of the surface; each adsorbing hole has a shape similar to a bugle and has a diameter of about 30 μm. The operating principle of the adsorbing holes is similar to that of a suction nozzle of an adsorption pendant.

Of course, the specific form of the adsorbing sheet of the first platform 1 is not limited when acting as an adsorbing unit. The adsorbing sheet may also be manufactured therein with a plurality of adsorbing holes connected to vacuum pipelines, like the second adsorbing surface 21.

According to one exemplary embodiment of the present invention, there is also provided a method of using the vacuum laminating device to laminate a first object and a second object in a vacuum environment, the method comprises steps of:

Step S1: adsorbing the first object onto the first adsorbing surface by the first platform, adsorbing the second object onto the second adsorbing surface by the second platform, and locating the lifting pushrod under the second object; for example, the first object may be a liquid crystal screen, and the second object may be a glass plate;

Step S2: arranging the vacuum laminating device in a vacuum chamber and vacuumizing the vacuum chamber, then raising the second platform to a pre-laminating position where the second object and a first object are close to but do not contact with each other; exemplarily, a distance between the raised glass plate and the liquid crystal screen may be about 2 mm;

Step S3: when a predetermined vacuum pressure value is arrived in the vacuum chamber, driving the lifting pushrod to move upward to push up a central portion of the second object so that the central portion contact with the liquid crystal screen firstly; exemplarily, the predetermined vacuum pressure value may be about 35 Pa, and preferably, an angle at which the central portion of the second object is pushed up is 2°~3°, so that the central portion contacts and laminates the liquid crystal screen firstly; and Step S4: driving the second platform to move upward so that the first object and the second object are completely laminated, thereby expelling out air bubbles from the centre to both sides of the laminated objected.

It can be understood that, when the second platform moves up so that the second adsorbing surface 21 is flush with the top of the lifting pushrod 3, the second object (for example, glass plate) and the first object (for example, liquid crystal screen) are completely laminated with each other, so that an aim of expelling out air bubbles from the centre to both sides of the laminated objects are achieved.

As a conclusion, the vacuum laminating device according to embodiments of the present invention can be used in the full laminating process of a liquid crystal screen, including the OCA and LOCA full laminating processes, and can be used in other applications, such as a new glue laminating process, in which a pre-solidification is performed first and then a substantial solidification is performed, and a technical effect of expelling out air bubbles from the centre to both sides can also be achieved. The vacuum laminating device has a good laminating performance during manufacturing samples, in which defect rate caused by bubbles is reduced to 0.5% from 3% of a conventional vacuum laminating machine, and a de-bubbling process can be omitted, such that a great improvement and benefit is achieved in the full laminating process.

The embodiments of the present invention are provided for illustrating and describing, not for limiting the present invention to the specific forms disclosed herein. Although several exemplary embodiments have been shown and described, it would be appreciated by those skilled in the art that various changes or modifications may be made in these embodiments without departing from the principles and spirit of the disclosure, the scope of which is defined in the claims and their equivalents.

What is claimed is:

1. A vacuum laminating device for laminating a first object and a second object together, comprising a first platform, a second platform, and a lifting pushrod that are receivable in a vacuum chamber, wherein a bottom surface of the first platform is provided with a first adsorbing surface suitable for adsorbing the first object;

the second platform is disposed below the first platform and drivable by a driving unit to move up and down below the first platform so as to make laminating contact with the first platform, and an upper surface of the second platform is provided with a second adsorbing surface facing the first adsorbing surface and being suitable for adsorbing portions of the second object other than a central portion of the second object;

the lifting pushrod is disposed within a region where a central region of the second adsorbing surface is located such that the central portion of the second object is not adsorbed by the second platform, and is configured to be movable up and down independently below the first platform so as to push up the central portion of the second object to cause the central portion to make laminating contact with the first object before other portions of the second object on either side of the central portion make laminating contact with the first object;

and the second platform is further configured to, in a state where the central portion of the second object is in laminating contact with the first object and the lifting pushrod is directly below a center region of the first adsorbing surface, move the other portions of the second object on either side of the central portion upward so that the first object and the second object are completely laminated with each other.

2. The vacuum laminating device according to claim 1, wherein the second platform comprises two half-platform structures spaced apart from each other, and the lifting pushrod is configured to be able to extend through a gap between the two half-platform structures so as to push up the central portion of the second object.

3. The vacuum laminating device according to claim 2, wherein the second adsorbing surface has two halves each being provided on top of a corresponding half-platform structure.

4. The vacuum laminating device according to claim 1, wherein the central region of the second platform is provided therein with a space for receiving the lifting pushrod, and the lifting pushrod is configured so that its top is able to extend out from the space above the second adsorbing surface to push up the central portion of the second object.

5. The vacuum laminating device according to claim 1, wherein a top of the lifting pushrod is provided with an arc surface for contacting the second object.

6. The vacuum laminating device according to claim 1, wherein the lifting pushrod is made from rubber.

7. The vacuum laminating device according to claim 6, wherein an adsorbing sheet is provided on the first adsorbing surface, made from polytetrafluoroethylene, and is provided with a plurality of adsorbing holes in its surface.

8. The vacuum laminating device according to claim 7, wherein the plurality of adsorbing holes are configured to achieve an adsorption to the first object through a differential pressure between outside and inside of the adsorbing holes.

9. The vacuum laminating device according to claim 7, wherein the plurality of adsorbing holes are connected to vacuum pipelines respectively.

10. The vacuum laminating device according to claim 7, wherein fixtures are provided at a periphery of the first platform, for securing the adsorbing sheet to the first adsorbing surface.

11. The vacuum laminating device according to claim 6, wherein the second adsorbing surface is provided therein with a plurality of adsorbing openings, which are connected to vacuum pipelines respectively.

12. The vacuum laminating device according to claim 6, wherein the first platform is made from metal, and the second platform is made from rubber.

13. The vacuum laminating device according to claim 6, further comprising said driving unit for driving the second platform and the lifting pushrod to move up and down independently.

14. The vacuum laminating device according to claim 1, wherein the first adsorbing surface is configured for adsorbing a liquid crystal screen, and the second adsorbing surface is configured for adsorbing a glass plate.

* * * * *